Figure 1:
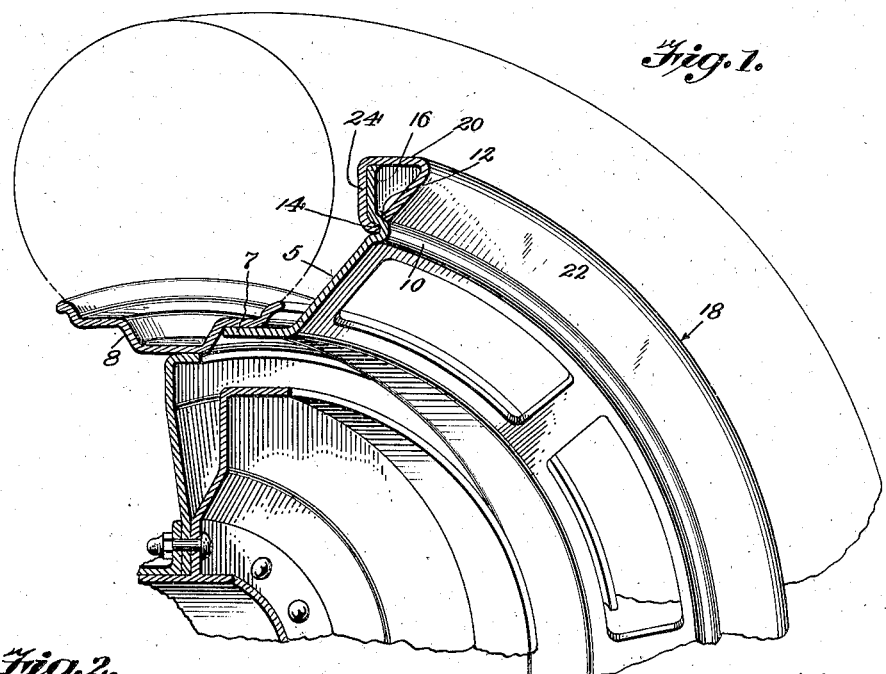

March 15, 1938.   R. DE PALMA   2,110,929
WHEEL GUARD
Filed Feb. 6, 1935

INVENTOR
RALPH DE PALMA

Patented Mar. 15, 1938

2,110,929

UNITED STATES PATENT OFFICE 2,110,929

WHEEL GUARD

Ralph De Palma, Detroit, Mich., assignor to American Tire Guard Company, Detroit, Mich., a corporation of Michigan Application February 6, 1935, Serial No. 5,279

7 Claims. (Cl. 301—39)

This invention relates to wheel guards for use in connection with vehicle wheels having resilient tires and will be found to provide for the continued and safe operation of the vehicle upon the collapse of the tire.

Broadly, the invention has to do with a tire guard in which the parts thereof are brought together in a manner which achieves maximum lightness, strength and resiliency and a relatively low cost of manufacture.

One specific phase of the invention has to do with an improved tread member for the guard, and by way of brief preliminary reference thereto, it is pointed out that the same contemplates a simple and expeditious means by which an initially separate tread member may be secured to the body of the guard without the intervention of welding or other fastening means, and in a manner which provides ample strength to withstand the radial, lateral and other stresses to which a guard of this type is subjected, it being observed in passing that in eliminating the necessity of welding the tread member to the body or employing bolts or other separate fastening means for this mounting, the cost of manufacture is decreased and at the same time an improved product is produced.

In addition, by making the tread member of the guard in a separate piece and then mounting the same upon the body of the guard, these major parts may, if desired, be made from dissimilar metals and, of course, produced by separate stamping, casting, rolling or other operations with the result that there is avoided the necessity of the complicated stamping operations necessary for the production of guards from single pieces of metal, all of which looks to a low percentage of rejections and an improved product.

Another advance marked by the invention resides in the provision of a tire guard or emergency wheel made up of a series of superposed layers of metal or other material, to provide the relatively great strength known to be inherent in a laminated structure and at the same time providing the greatest wall thicknesses at the places most needed.

Also, there is to be considered the fact that a laminated structure provides for a hard, wear-resisting outside surface and a soft and tough inside or underlying structure, or vice-versa, without the necessity of resorting to case hardening steps that would otherwise be necessary to achieve this highly desirable end, and finally, the manufacture of a guard in the form of laminations has the effect of simplifying the stamping operation because, as is known, several relatively thin sheets of metal may be stamped into the desired shape much more expeditiously and conveniently than is possible with a single thick piece of metal having a wall thickness approximating the aggregate thickness of the laminations.

The invention further looks to a wheel guard of the type suggested which is economical to manufacture, resilient for the purpose of absorbing shock due to initial and continued contact with the ground, one that is neat in appearance, and which by reason of the grace of lines thereof and its harmonious association with the adjacent tire, actually has the effect of improving the appearance of the vehicle upon which it is mounted.

Other objects and advantages will be apparent during the course of the following description.

Figure 2:
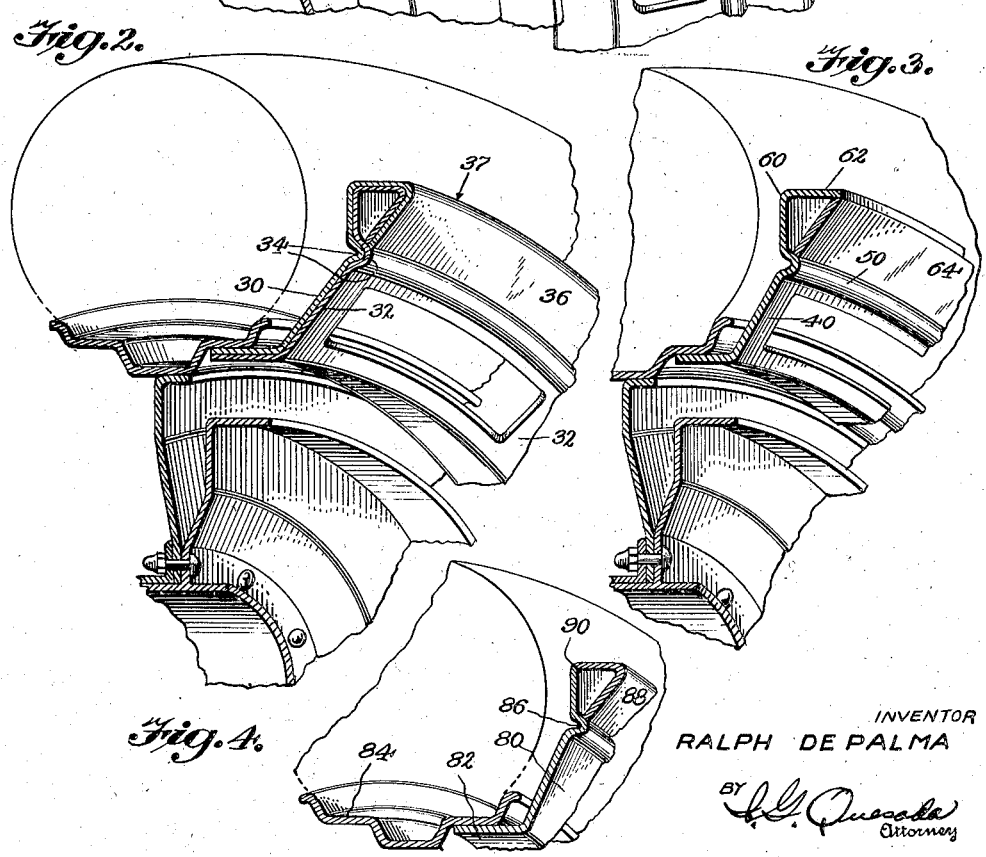
Figure 3:
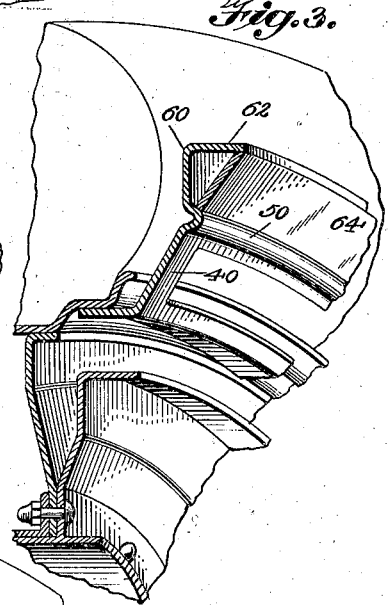
Figure 4:
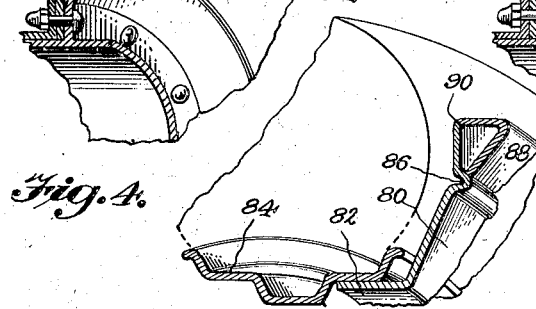

In the accompanying drawing, forming a part of this application and in which like numerals are employed to designate like parts throughout the same, Figure 1 is a fragmentary sectional perspective disclosing a wheel guard embodying the invention, Figure 2 is a similar view disclosing a modification, Figure 3 is a similar view disclosing a further modification, Figure 4 is a detail sectional view disclosing another expression of the invention.

In the drawing, the numeral 5 designates the body of the improved guard, the body being shown in the form of an annulus having the inner peripheral portion thereof provided with suitable attaching means such, for example, as a laterally projecting flange 7 secured by welding or other suitable means to the adjacent portion of the rim 8. However, it is clear that the invention is not restricted to the specific attaching means herein disclosed and that any other attaching means found adaptable for the purpose may be employed with equal advantage without departing from the scope of the invention.

The body 5 of the guard is formed between the inner and outer peripheral portions thereof with an annular strengthening and reinforcing bead 10 defining oppositely located crotches 12 and 14 and at the same time defining a radially projecting bracing flange 16.

It is clearly illustrated in Figure 1 that a tread member 18 is associated with the peripheral outer portion of the body 5 and, of course, is formed as a separate element for subsequent connection with the body of the guard.

The tread member 18 is shown to be substantially triangular in cross-section with the bight or connecting portion 20 thereof positioned to form a tread surface, while the legs 22 and 24 of the tread member are in converging relation, of course, and are associated with the bead 10 in a manner which provides for the firm connection of the tread member with the body without the intervention of welding or other extraneous fastening means.

In explaining this important feature of the invention it is pointed out that the leg 24 extends closely along one side of the peripheral flange 16, flatly in contact therewith, and has the inner edge portion thereof turned into and closely nested in the crotch 14. On the other hand, the inner edge portion of the leg 22 is nested in the crotch 12 at a point diagonally opposite the inner edge portion of the leg 24 so as to cooperate with such inner edge portion of the leg 24 in binding or securing the tread member 18 to the body 5.

Otherwise expressed, the bead 10 defines a wall extending at an acute angle to the radius of the guard, and such wall is firmly clamped between the inner edge portions of the converging walls 22 and 24 with the result that the tread member is held in a firmly anchored position on the body 5. To further hold the tread member firmly in position with respect to the body 5, the outer peripheral edge of the flange 16 is in direct engagement with and consequently has the effect of bracing the bight portion 20 of the tread member 18.

In other words, the tread member 18 has a firm attaching connection at the inner edges of the legs 22 and 24 thereof and is braced at the bight portion 20 thereof by the peripheral flange 16 which leads to the statement that there is a multipoint contact between the tread member and the body 5 producing a firm connection between the tread member and the body without the intervention of such extraneous fastening devices as welding.

The particular means employed for mounting the tread member provides for the creation of the tread member in a stamping, casting, rolling or other process, separate and apart from the means employed for the creation of the body 5, and in this way there is avoided the need of the complicated stamping operation necessary for the production of these major parts in a single step.

The multi-point contact between the tread member and the body of the guard and the generous area of contact between these parts is such that the guard is enabled to withstand the radial, lateral and other stresses to which a device of this character is known to be subjected, without disturbing or loosening the firm connection between the several parts of the guard.

Coming now to Figure 2, it will be seen that the guard may be made from a series of laminations 30 and 32, or additional laminations if desired, and in this case, such laminations are provided with complemental interfitting, circumferential strengthening and reinforcing annular beads 34 functioning, not only as such, but as a support or resting place for one leg 36 of a tread member 37.

More particularly, the tread member 37 is located radially outward of the bead 34 and is formed with converging legs and an intervening bight or tread portion which, of course, constitutes the base of the triangle.

One leg of the triangular tread member 37 is shown to constitute what might be said to be a continuation of the annular strengthening bead 34, while the other leg of the triangular tread member is shown to rest upon and to be supported by the bead 34.

With further reference to the formation of the guard from a plurality of complemental laminations, it will be seen that such laminations are held together first, by the various turns necessary for the formation of the beads 34 and, second, by the abrupt bends required for the formation of the tread member 37. This positively prevents the separation of the various laminations and holds these parts securely together without the intervention of rivets or other fastening means.

It will be seen that the formation of the guard from a plurality of complemental laminations provides the great strength known to be inherent in a structure of this kind without the need of the relatively great wall thickness necessary for equal strength in a one-piece structure.

Also, by resorting to a laminated structure, there is made possible the employment of dissimilar metals, a hard wearing surface and an underlying soft and tough surface, or vice-versa.

More specifically, if desired, the road contact lamination of the guard may be made of a metal having a relatively high carbon content allowing the same to be brought, by tempering, to a relatively high degree of hardness to resist abrasion and wear, while the inner lamination may be of a soft and tough steel or other material to provide the supporting strength for the outer lamination.

In the form of invention illustrated in Figure 3, the body of the guard is designated by the numeral 40 and may be formed by a single stamping or casting operation and is provided between the inner and outer peripheral edge portions thereof with an annular strengthening bead 50.

The portion of the body 40 radially outward of the bead 50 is shown to be provided with a lateral bend 60 defining a tread portion 62. In this form of invention, it is proposed that there shall be a plate 64 positioned closely between the otherwise free edge of the tread portion 62 and the bead 50 so as to support the tread portion 62. This plate 64 is welded or otherwise secured at the edge thereof to the adjacent edge of the tread portion 62 and looks to the elimination of the complicated and difficult stamping operation necessary for the formation of a tread member triangular or substantially triangular in cross-section.

In the form of invention disclosed in Figure 4, the body 80 of the guard is in the nature of an annulus secured possibly by a flange 82 to the rim 84 or other appropriate part of the wheel.

The body 80 is shown to be provided at a point between the inner and outer peripheral edges thereof with a lateral, annular deformation defining a strengthening bead 86 corresponding to the bead 50.

A separate tread member 88, substantially V-shaped in cross-section, is welded or otherwise joined at one edge thereof as indicated at 90 to the outer peripheral edge of the annulus 80, while the inner leg of the V-shaped tread member is nestled in the crotch defined by the bead 86. This provides a very simple method of manufacture and avoids the need of complicated stamping, rolling and other operations that would be necessary for the formation of the guard from a single piece of metal.

With reference to the foregoing, it will be seen that the invention looks to the provision of a tire guard characterized by great strength with unusual lightness for a device of this character and that the guard may be mounted inconspicuously at one side of a tire, possibly the inner side thereof, to provide an ever present means by which, in the event of a blowout or loss of tire pressure through any cause, the vehicle is allowed to continue in a straight line, without the possibility of being forced to one side of the road or turned over as so many times results from sudden loss of tire pressure.

One of the major problems in connection with the use of wheel guards of the type shown herein is the matter of weight. Of course, the weight of the guard is unsprung and it is required that this weight be kept to the minimum, failing which the usefulness and the acceptability of the device is greatly diminished.

It has been found that the manner of bringing the separate parts together as disclosed and as claimed herein provides the required lightness with great strength. At the same time, a wheel guard as constructed herein provides for simple manufacture and avoids the need of complicated stamping, rolling and other operations necessary for the construction of the guard from a single piece of metal. However, from the foregoing it should be apparent that the invention disclosed and claimed herein involves more than the mere duplication of parts or the making of the body in the form of a plurality of laminations where it was formerly made in one piece, it being fully recognized that the mere duplication of parts is barren of invention.

If it happens that no spare tire is available, the guard serves as an emergency wheel allowing the car to be driven to a place of tire repair. It has been found that, even though the car is driven over long distances with the deflated tire in place, no damage is done to the tire. This is true because, as is clear from the drawings, the guard supports the weight of the vehicle and thereby prevents the rim of the wheel from cutting through the tube and into the material of the deflated casing, it being observed that it is a matter of common knowledge among motorists, that if a car is driven on a flat tire for a distance of only a few yards, it is not unusual to find that the inner tube has been completely destroyed and the wall of the casing broken down to a point where the tire is of little use and, in any event, is in need of major repair.

Repeated tests at high speeds have shown that the improved guard is possessed of ample strength to withstand the shock due to sudden and continued contact with the ground and that there is an absence of the terrific noise and jolting that is known to accompany the operation of a vehicle on the rim only.

What is claimed is:

1. In a wheel guard, an annular body provided between the inner and outer peripheral portions thereof with an annular strengthening bead defining a wall between the inner and outer peripheral edges of the annular body and extending at an acute angle to the radius of the body, and a separate tread member receiving the outer peripheral portion of the body and having converging legs for clamping engagement with opposite sides of the said wall of the bead to secure the tread member in place.

2. In a wheel guard, an annular body provided between the inner and outer peripheral portions thereof with an annular strengthening bead defining a wall extending at an acute angle to the radius of the body, and a separate tread member having converging legs in firm pressure engagement with opposite sides of said wall of the bead to clamp the intervening wall and thus secure the tread member in position, the outer peripheral portion of said annular body being in bracing engagement with the outer portion of said tread member.

3. In a wheel guard, an annular body provided between the outer and inner peripheral edges thereof with an annular strengthening bead defining oppositely located crotches, and a separate tread member having an outer tread portion and converging attaching legs, the inner portions of said legs being nested in said crotches and being in pressure engagement with the intervening portion of said annulus to secure the tread member in place.

4. In a wheel guard, an annular body provided between the outer and inner peripheral edges thereof with an annular strengthening bead defining oppositely located crotches, and a separate tread member having an outer tread portion and converging attaching legs, the inner portions of said legs being nested in said crotches and being in pressure engagement with opposite sides of the intervening portion of said annulus to constitute means securing the tread member in place, the outer peripheral portion of said annulus being in bracing relation to said tread portion of the tread member.

5. In a wheel guard, an annular body provided between the outer and inner peripheral edges thereof with an annular strengthening bead defining oppositely located crotches and an intervening angular wall, and a separate tread member having an outer tread portion and converging attaching legs, the inner portions of said legs being nested in said crotches and being in pressure engagement with opposite sides of the intervening wall to secure the tread member in place, the outer peripheral portion of said annulus being in bracing relation to said tread portion of the tread member and extending closely along one of said converging legs and in contact therewith.

6. In a wheel guard, an annular body provided between the inner and outer peripheral portions thereof with an annular strengthening bead defining a wall extending at an acute angle to the radius of the body, and a separate tread member receiving the outer peripheral portion of said annular body and having converging legs engaged with said wall of the bead, said tread member and said body being of dissimilar materials.

7. In a wheel guard, an annular body provided adjacent the outer periphery thereof with annular strengthening bead defining radially spaced crotches located at opposite sides of the body, and a separate substantially triangular shaped tread member having the inner portions of the legs thereof seated in said crotches in pressure engagement with the opposite sides of said bead to secure the tread member in place, the outer peripheral portion of said body being in bracing relation to the tread portion of said tread member.

RALPH DE PALMA.